(12) United States Patent
Mizuno et al.

(10) Patent No.: US 6,246,920 B1
(45) Date of Patent: Jun. 12, 2001

(54) CONTROL APPARATUS OF PRODUCTION FACILITY

(75) Inventors: Thoru Mizuno, Tama; Masahiko Hosokawa; Minoru Nakamura, both of Oshino-mura, all of (JP)

(73) Assignee: Fanuc Limited, Yamanashi (JP)

( * ) Notice: Subject to any disclaimer, the term of this patent is extended or adjusted under 35 U.S.C. 154(b) by 0 days.

(21) Appl. No.: 09/142,746

(22) PCT Filed: Jan. 16, 1998

(86) PCT No.: PCT/JP98/00138

§ 371 Date: Sep. 15, 1998

§ 102(e) Date: Sep. 15, 1998

(87) PCT Pub. No.: WO98/31501

PCT Pub. Date: Jul. 23, 1998

(30) Foreign Application Priority Data

Jan. 16, 1997 (JP) .................................................. 9-17786

(51) Int. Cl.[7] ..................................................... G06F 19/00
(52) U.S. Cl. .......................... 700/159; 700/180; 700/182; 700/105
(58) Field of Search ..................................... 700/159, 175, 700/180, 108, 95, 181, 87, 12, 17, 2–4, 11, 76, 155, 100–105

(56) References Cited

U.S. PATENT DOCUMENTS 5,239,476 * 8/1993 James et al. ........................ 700/170
5,283,749 * 2/1994 Tanahashi ........................... 700/175
5,544,046 * 8/1996 Niwa ................................... 700/159
5,914,880 * 6/1999 Yasojima et al. .................... 700/159

FOREIGN PATENT DOCUMENTS

| 61-244448 | 10/1986 | (JP) . |
| 62-224555 | 10/1987 | (JP) . |
| 63-174822 | 7/1988 | (JP) . |
| 3-141405 | 6/1991 | (JP) . |
| 4-63616 | 2/1992 | (JP) . |
| 4-164558 | 6/1992 | (JP) . |
| 5-265531 | 10/1993 | (JP) . |
| 6-262496 | 9/1994 | (JP) . |
| 6-309026 | 11/1994 | (JP) . |

* cited by examiner

Primary Examiner—William Grant
Assistant Examiner—Kidest Bahta
(74) Attorney, Agent, or Firm—Staas & Halsey LLP (57) ABSTRACT

A controller is obtained by adding the function of a virtual operator to a numerical control device. Data on the construction and capacity of a machine, as a control object, are stored as system data in advance. Work instructions are inputted by the operator or through a host system. The virtual operator, comparing the contents of the work instructions with the system data, determines whether automatic processing is possible or manual processing is required. If the automatic processing is possible, the automatic processing is carried out. If the manual processing is necessary, explanation diagrams, messages, etc. are displayed. Every time a request button for further explanation is depressed, a more detailed work explanation is displayed. Thus, the operation is simplified, and the work explanation can be obtained according to the skill of the operator.

13 Claims, 8 Drawing Sheets

COMPOSITION OF WORK INSTRUCTION

FIG. 10

CONTENTS OF WORK INSTRUCTION

CONTROL APPARATUS OF PRODUCTION FACILITY

FIELD OF THE INVENTION

The present invention relates to a controller, such as a numerical control device, for controlling production facility, such as a machine or system, and a control method therefore.

BACKGROUND OF THE INVENTION

In a conventional production facility, such as a production system or machine, programs for work instructions are generated in consideration of the construction and function of the production facility, attachment devices attached to the equipment, and the functions and capability of the attachment devices. The work instructions are generated for each system or machine in consideration of, for example, the provision of a measurement device (measuring function) for the machine or system and the degree of adaptation of the measurement device (measuring function) to automatic measurement.

Further, user interfaces of the controller lack versatility, so that an operator must be trained to learn an operating method and become familiar with the operating method. Thus, the operator must adapt himself to the controller.

There are a plurality of machines that are applicable to the same purpose although they have different constructions or are provided with different attachment devices. Even in the case where all these machines are used for the same service, the machines cannot necessarily be activated and operated in accordance with the same work instructions, and thus the work instructions must be created for each of these machines. Accordingly, the formation of work plans takes much time.

If a work having so far been performed by means of a certain machine is to be executed by means of another machine having a different construction and attachment devices, it is impossible to drive and cause the second machine to execute the same operation in accordance with the same work instruction program. Moreover, since the contents of the operation to be done by the operator vary with the machine, the degrees of freedom of relocation of the machine and formation and modification of work plans are limited depending on the operator's ability, thereby giving rise to a problem that the plant cannot be operated flexibly as the whole.

Even in the case where there are provided a plurality of machines that have equivalent specifications and system configurations and can be operated by common work instructions, change or improvement of the specifications of any one machine can disable the rest of the machines from being operated by common operation commands. In order to maintain the commonness, therefore, the respective specifications of all the machines must be changed or improved with the same contents and at the same timing. This entails a useless investment and results in inflexible system employment.

Since the user interfaces of the controller lack versatility, moreover, the operator must master the operation of the controller by practice. Even if the operator gets skilled to be able to operate the controller directly with ease without undergoing any troublesome operation, however, the operator must carry out the operation on the basis of the user interfaces which is not versatile.

OBJECTS OF THE INVENTION

An object of the present invention is to provide a controller for production facility, capable of determining by itself whether work commanded in accordance with the construction and capability of the production equipment, such as a machine or system, is to be processed automatically or to be processed manually.

Another object of the present invention is to provide a controller capable of carrying out operation depending on and matching the skill of an operator.

In order to achieve the above objects, a controller for production facility according to the present invention includes: a control section for controlling production facility, such as a machine or a system, as a control object; storage means for storing system data on the construction, capacity, and specifications of the production facility; and determining means for interpreting the contents of inputted work instructions and determining, with reference to information corresponding to the work instructions and stored in the storage means, whether or not the contents of the work instructions can be automatically processed by the control section.

According to the present invention, as described above, the controller for production facility itself can determine whether automatic processing is feasible or whether manual processing is necessary. Accordingly, the same work instructions can be used for production facilities that are to be used for the same purpose, making such work instructions applicable universally. Thus, the work instructions need not be created for each production facility, so that the formation and modification of work plans can be carried out with ease, and the plant can be worked flexibly.

Work explanations for interaction between the controller and an operator, ranging from general ones to specific ones, are compiled for various levels, so that explanations that match the skill of the operator can be selected, and a guide can be obtained for the ease of operation without regard to variation in the skill. Further, the operation of the controller becomes easier in proportion to the skill of the operator, so that the operation and work can be carried out efficiently.

DESCRIPTION OF THE PREFERRED EMBODIMENTS

Referring first to the functional block diagram of FIG. 1, an outline of one embodiment of a controller according to the present invention will be described.

Figure 1:
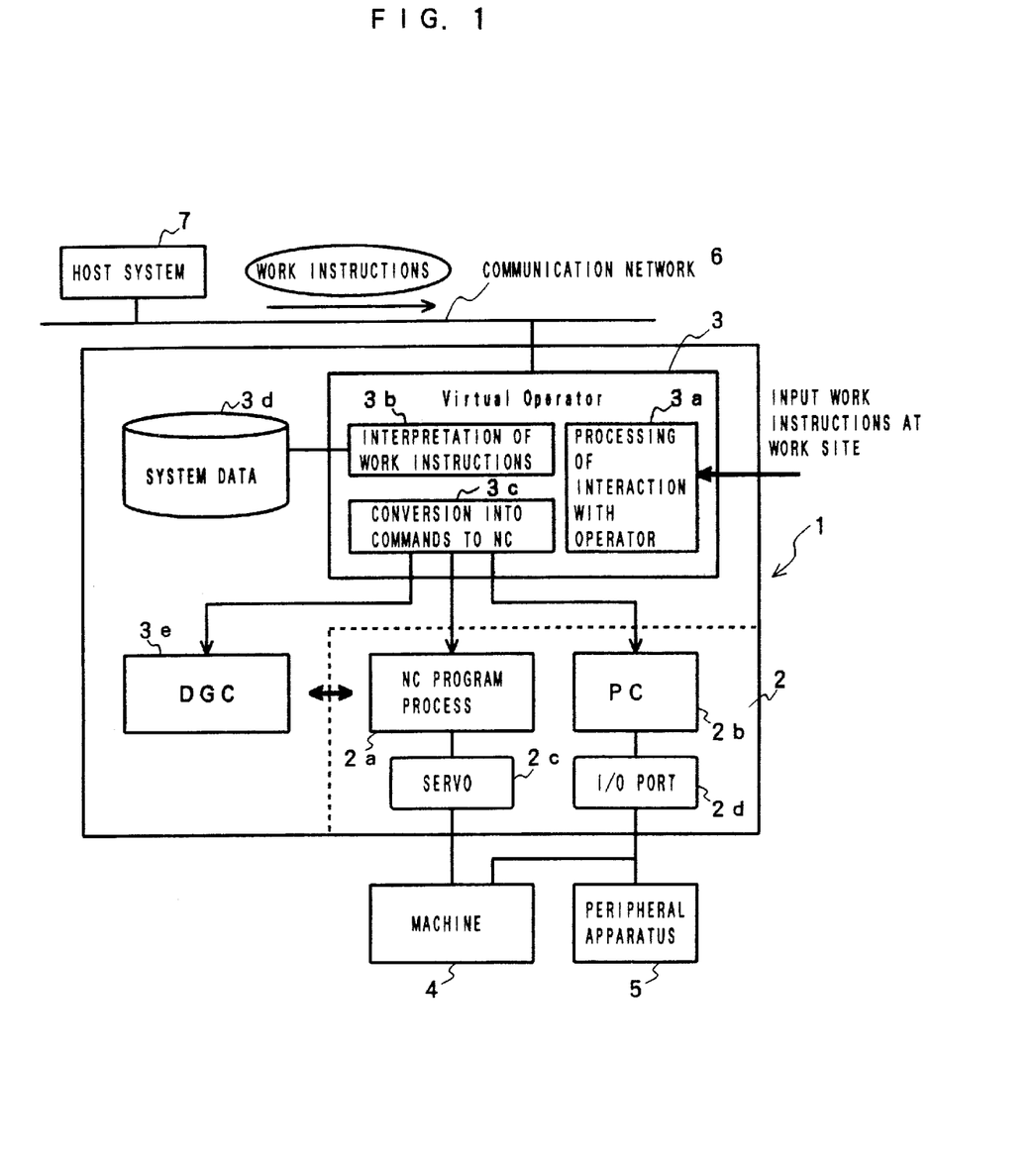
FIG. 1 is a functional block diagram according to one embodiment in which the present invention is applied to a numerical control for controlling a machine tool.

This controller 1, as shown in FIG. 1, is made up by adding functional block 3 for a virtual operator, a block for storing system data 3d, a functional block 3e for DGC (dynamically generated control) to a conventional numerical control device (CNC) 2 which serves to control various machines.

The numerical control device 2, like a conventional one, includes a block 2a for decoding and executing NC programs, and drives a servo amplifier 2c in accordance with the NC programs, thereby driving servo motors that are provided in a machine 4. Further, the numerical control device 2 has the function of a programmable controller (PC) 2b that processes digital signals and analog signals transferred between the machine 4 and a peripheral apparatus 5 through an input-output port 2d in accordance with sequence programs. This numerical control device 2 has the same arrangement, effect, and function as those of a conventional CNC device.

The functional block 3 for the virtual operator, which is a functional block of control software that consists of the virtual operator, comprises a functional block 3a for processing interaction with the operator, a functional block 3b for interpreting the contents of work instructions, and a function 3c for converting the inputted work instructions into commands to the numerical control device 2. The system data 3d includes information on the configuration, specifications, etc. of the machine system. The functional block 3b for interpreting work instructions interprets the contents of the inputted work instructions, and, by referring to the system data 3d, determines whether the contents of the work instructions can be automatically processed or require the operator's participation.

The functional block 3e for DGC is provided for automatically processing those parts of the work instructions which cannot be processed by means of the function of the numerical control device 2. In the case of a work instruction for MEASURE EVERY 100 WORKPIECES PROCESSED, for example, termination of processing of 100 workpieces is detected, and processing from the start of a measurement routine to the end thereof is executed by this functional block 3e for DGC.

When the functional block 3b for interpreting work instructions concludes that the work instructions can automatically be processed, the automatic processing is executed by the functional block 3e for DGC if it cannot be carried out by the numerical control device 2.

Further, the controller 1 is connected to a host system 7, such as a host computer, through a communication network 6.

For the system data 3d, the system configuration and specifications of the machine, for example, are set and stored when the machine system configuration is settled, e.g., when the machine is shipped. When change of the specifications, addition of a function, rise in the level, or addition of a peripheral apparatus are made, the system data 3d are read out and displayed on a display unit, for rewriting or updating in accordance with the added or changed contents, and stored in a memory. The system data 3d are also transmitted to the host system through the communication network and are managed by means of the host system.

Further, user interface is stratified to match the skill of each operator. The interfaces of the individual strata are stored in a memory of the host computer of the host system 7 or the like. Alternatively, the interfaces of the individual strata may be stored as the system data 3d. The work instructions can be either automatically read from the host system 7 through the communication network 6 or created by the operator who uses an operating device of the controller.

The work instructions are composed of instructions for machining by means of the numerical control device 2 and instructions for collateral processing (preprocessing, post processing, etc.) for effecting the machining. The instructions for machining include the names of NC programs to be executed by the NC program process 2a, sequence program names to be executed by the PC 2b. The instructions for collateral processing are composed of regular statements and functional codes having special meanings. Portions written in the functional codes and portions of the regular statements have the characters of work instruction programs and program comments, respectively, and the regular statement portions are displayed directly on the display unit. Further, the functional code portions are for execution of given programs in accordance with the functional codes. In the present embodiment, the functional codes are discriminated from other statements by being enclosed between "<" and">".

Figure 9:
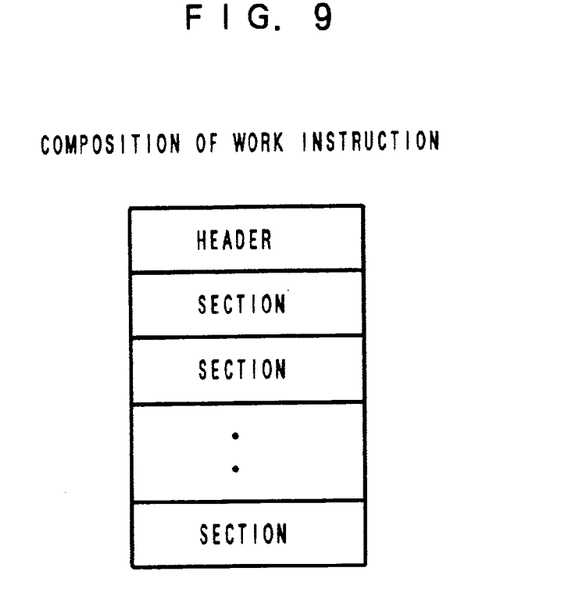
FIG. 9 is a diagram for illustrating the composition of a work instruction.

As shown in FIG. 9, each instruction is composed of a header and a plurality of sections following the header and defined for individual work units. Common items for the work instruction are described in the header. An example of the header is given below.

"Version 2.1
For five-axis milling
Indeterminable case: To host"

The "Version 2.1" represents a version of the grammar of this work instruction; the "For five-axis milling" indicates machining to be performed; the "Indeterminable case: To host" indicates a system in which the host system is asked for an instruction for the case where the interpretation and execution of the functional codes are impossible. If "Indeterminable case: To display" is given, the instruction is displayed on the display unit instead of inquiring to the host system for it, whereby the operator is urged to settle obscure points.

Each section, which is a command for one work unit, ends with "<e>". On the other hand, each work instruction ends with "<END>".

A work instruction for "process for attaching workpiece to pallet", as an example of such section, is as follows. Since this work instruction is one for prearrangement or preprocessing, it is equivalent to an instruction for collateral processing.

"Stage 1: attachment of workpiece to pallet,
Workpiece name: front-left door frame,
Pallet to be used: PL002,
Depress explanation diagram display button to display explanation diagram,
<b/button 1, draw 1.doc>
The center of a work coordinate system is at +200 mm in the longitudinal direction from the pallet center,
Recognition of termination: depress completion button when work is finished,
<b/button 2, report>
<e>"

The work contents of this work instruction imply the attachment of a mold frame for the door on the left-hand side of the front seat of a vehicle to a pallet (PL002). As a mounting position, the origin of the work coordinate system is represented by a position relative to the pallet center.

When this work instruction is read, as mentioned later, the regular statement portions are displayed directly on the display screen of the display unit. When the portion <......>, which is indicative of a functional code, is read, processing for this functional code is carried out. In the aforesaid case, concerning the explanation diagram display button, the functional code "b" is followed by a first argument for a button plotting data named "button 1", and a second argument for an explanation diagram with a file name of "draw 1.doc" is commanded. In the functional code processing for this case, the button plotting data named "button 1" is read from a host system, and the button "button 1" is displayed in a predetermined place on the display screen. When this button is depressed, the file explanation diagram data, "draw 1", is read from the host system, and the explanation diagram is displayed.

Similarly in the case of the functional code for the completion button, the completion button is displayed as the button plotting data named "button 2". When this button is depressed, the virtual operator is notified ("report").

Further, a work instruction for "process for measuring workpiece for result of machining" is given below as another example of the section. Since this work instruction is associated with processing after machining, it is an instruction for collateral processing.

"Stage 6: measurement
Explanation: The following region is measured automatically or manually.
Region to be measured: diameter of pocket hole
Reference value: 150 mm
Allowable error: ±0.01 mm
Spot to be measured: three points on side face of hole
Measurement condition: measuring once for each 100 workpieces
<m1/pocket hole, d, 150 mm, +0.01 mm, −0.01 mm, 3 point>
<m2/100>
<m3/program pocket hole 3>
<m4/"measurement result:", result, NG>
<m5/measure, date, work name, work no, result, deviation, NG>
<m6/post measure process>
<m7/"depress explanation diagram button and operate by displayed explanation", <B/button 1, measure guide>>
<e>"

In the work instruction described above, the functional code m1, as being an argument such as one given in a regular statement, gives basic data for measurement, and instructs that the pocket hole diameter (d) be measured and that three points be measured with the reference value of 150 mm and the allowable error from +0.01 mm to −0.01 mm. As mentioned later, data assigned by this functional code m1 and information on a measuring instrument stored as system data in the controller are compared to determine whether or not the commanded measurement can be processed automatically. If it is determined that the automatic processing is feasible, the virtual operator decodes the functional codes m2 to m6 that are commanded thereafter, and carries out commanded processing.

Further, if the comparison between the data assigned by the functional code m1 and the system data tells that automatic measurement cannot be made (e.g., that no measuring instrument is provided or that the resolution of the measuring instrument is lower than an assigned allowable error so that the measurement cannot be made within the range of the allowable error), the functional code m7 is looked up, and processing commanded by this functional code is carried out.

The functional code m2, which specifies the measurement condition, has an argument that specifies the number of workpieces for each cycle of measurement. In this example, the measurement is supposed to be made once for each 100 workpieces.

Further, the functional code m3 has an argument that assigns the measuring instrument program name for the case where the automatic measurement is feasible. The functional code m4 specifies display of the measurement result. The argument, "result", represents data on the measurement result, while NG indicates whether or not the result is within its tolerance. For example, the following details are displayed on the screen.

"measurement result: 150.009 mm OK"

The functional code m5 specifies recording of the measurement result. A first argument represents the name of a file to be recorded. In the example described above, the result is stored in a file "measure". A second argument and its subsequent arguments successively assign data to be stored, such as the date, workpiece name, workpiece number, measurement data, deviation from the reference value, etc. The functional code m6 specifies the program name for post processing after measurement. In discharging the workpiece to another place in the case where the measurement result is not within the range of its allowable error, the name of the program for executing the operation is described.

The functional code m7 serves to give an instruction for manual measurement to the operator when it is determined that the automatic measurement is unfeasible. In the example described, the button 1 (button 1) is displayed together with an explanation message. If this button 1 is depressed, a guide for measurement, "measure guide", is displayed.

Figure 2:
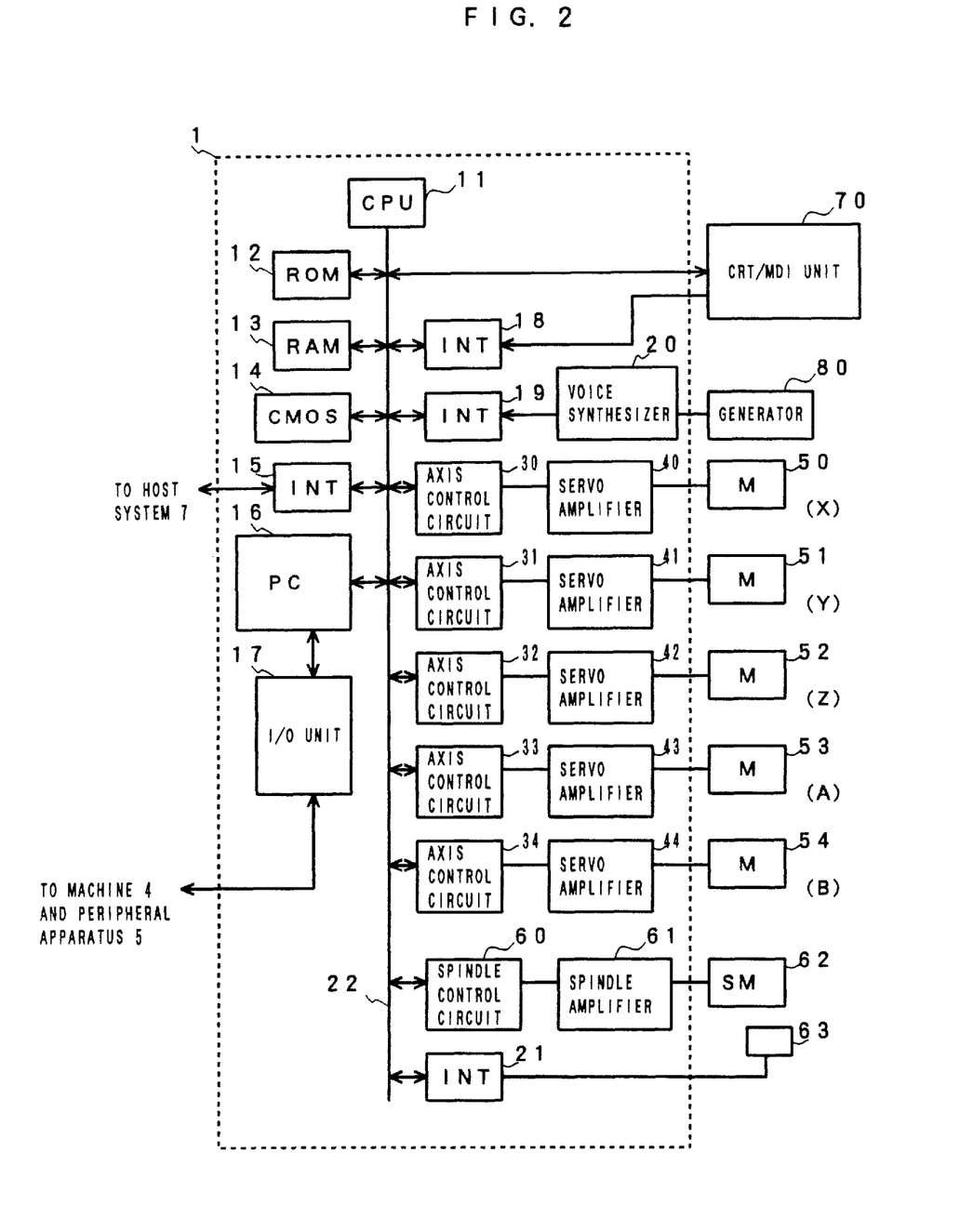
FIG. 2 is a block diagram according to one embodiment in which the present invention is applied to a five-axis numerical control device.

FIG. 2 is a block diagram according to one embodiment in which the present invention is applied to a five-axis numerical control device, which differs from a conventional numerical control device only in software for an virtual operator but not in hardware.

A processor 11 of the controller 1 is a processor for generally controlling the controller 1. The processor 11 reads system programs stored in a ROM 12 through a bus 22 and generally controls the controller 1 in accordance with the system programs. A RAM 13 is loaded with programs to be executed, temporary computational data, display data, and various data inputted by the operator by means of a CRT/MDI unit 70. A CMOS memory 14 is formed as a nonvolatile memory, which is backed up by means of a battery (not shown) so that its storage state can be maintained even if the controller 1 is turned off. Thus, the memory 14 can be stored with the aforementioned system data, the work instructions read from the host system through an interface 15, and the work instructions inputted by means of the CRT/MDI unit 70. Further, the ROM 12 is previously stored with various system programs for carrying out edit mode processing, which is needed to generate and edit the work instructions, and processing for automatic operation.

The interface 15 connects the controller 1 to the host system 7 through the communication network (Ethernet) 6.

The PC (programmable controller) 16 controls auxiliary devices of a machine tool, e.g., actuators such as a robot hand for tool replacement, in accordance with sequence programs stored in the controller 1. More specifically, these sequence programs are converted into necessary signals for the auxiliary devices according to M, S, and T functions commanded by a machining program given by the work instructions, and the signals are delivered from an I/O unit 17 to the auxiliary devices. The auxiliary devices, such as various actuators, operate in response to the resulting output signals. In response to signals from various switches on a control panel that is attached to the body of the machine tool, necessary processing is carried out, and the results are delivered to the processor 11.

Image signals from image data, such as the explanation diagram, read from the host system are delivered to the CRT/MDI unit 70 and displayed on its display in accordance with messages read from the work instructions and commands inputted by the operator's button operation or the like. The CRT/MDI unit 70 is a manual data input device that is provided with the display, a keyboard, etc. An interface 18 receives data from the keyboard of the CRT/MDI unit 70 and delivers them to the processor 11. An interface 19 is connected with a voice synthesizer 20, and messages and the like are delivered to the operator in a voice by the voice synthesizer 20 through a voice generator 80.

Axis control circuits 30 to 34 for X-, Y-, Z-, A-, and B-axes receive move commands for the individual axes from the processor 11 and deliver the commands for the axes to servo amplifiers 50 to 54 for the individual axes of the machine tool. Receiving those commands, the servo amplifiers 40–44 drive servo motors 50–54 for the axes of the machine tool respectively. Each of the servo amplifiers 50 to 54 for the individual axes has a position-speed detector built-in, and position and speed feedback signals are fed back from the position-speed detectors. In FIG. 2, a description of the feedback of the position signals and the speed feedback is omitted. Basic position, speed, and current loops are processed in the same manner as in the case of the conventional numerical control device.

A spindle control circuit 60 receives a main spindle rotation command for the machine tool and delivers a spindle speed signal to a spindle amplifier 61. The spindle amplifier 61 receives the spindle speed signal and cause a spindle motor 62 of the machine tool to rotate at an commanded rotational speed. The spindle motor 62 is coupled with a position coder 63 by means of a gear or belt. The position coder 63 outputs feedback pulses in synchronism with the rotation of the main spindle, and the feedback pulses are delivered through an interface 21 to be read by the processor 11.

Figure 3:
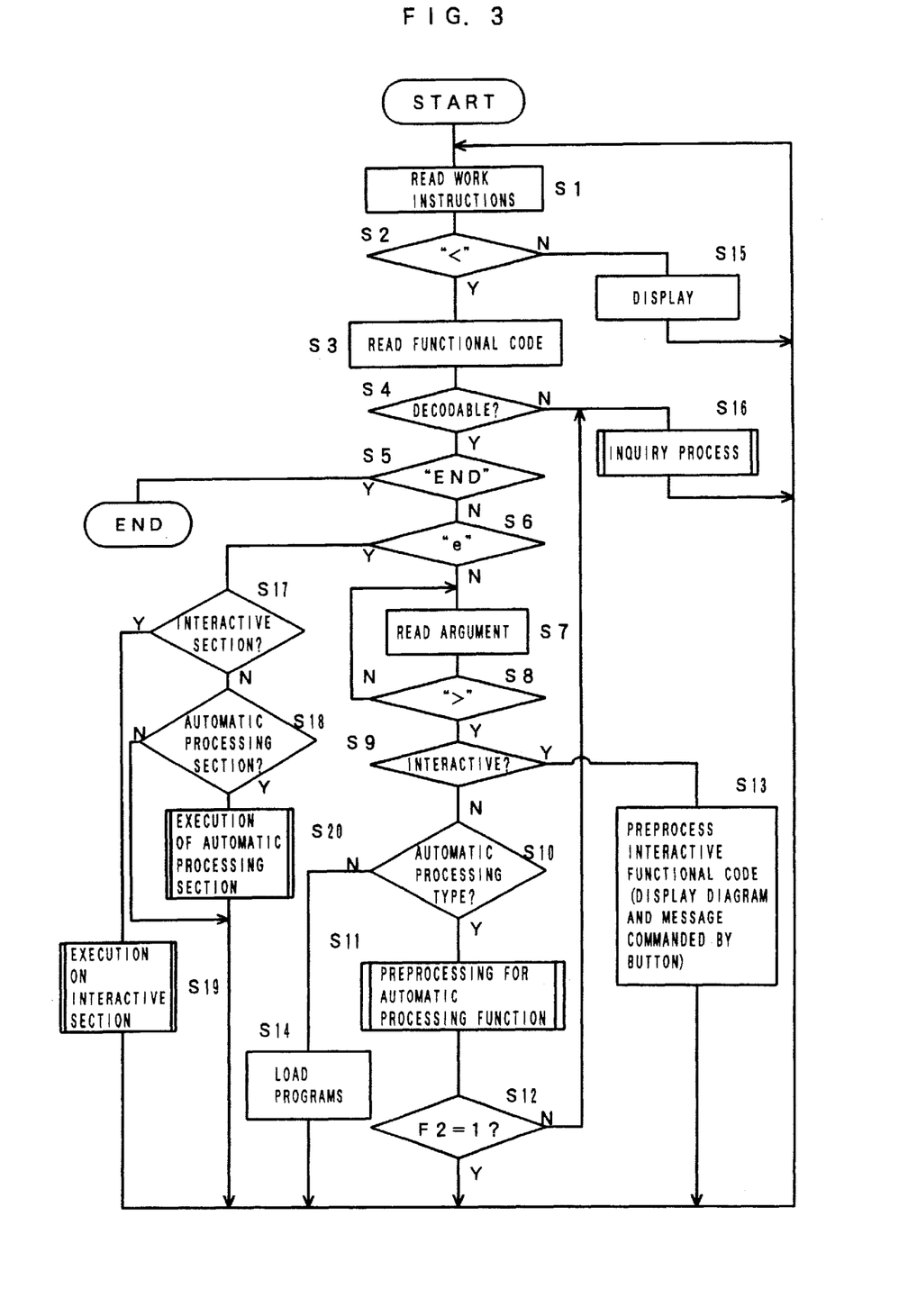
FIG. 3 is a flowchart for a work instruction reading process according to the same embodiment.

The processor 11 of the controller 1 starts the processing shown in FIG. 3 when an execution command for a work instruction is inputted after the work instruction is read from the host system into the CMOS 14 via the interface 15 or when the CRT/MDI unit 70 is operated to generate the work instruction and store it in the CMOS 14.

Figure 10:
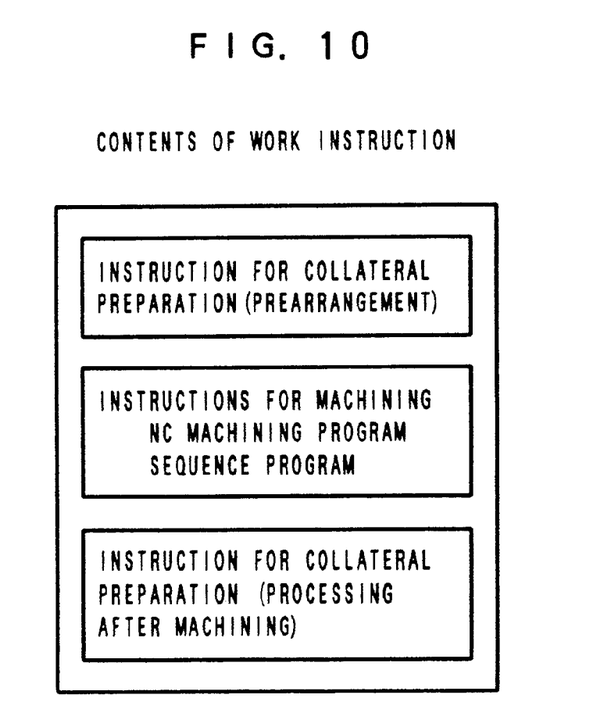
FIG. 10 is a diagram for illustrating the contents of the work instruction.

As shown in FIG. 10, the contents of the work instruction, for example, comprises an instruction for an collateral processing (prearrangement), an instruction associated with machining (instruction for machining) in the next place, and finally, an instruction for an collateral processing (post-machining process) such as measurement process. The instruction for machining include machining programs and sequence programs.

Referring now to the flowcharts of FIGS. 3 to 8, a process for reading the work instructions and the like will be described in connection with the case where the instruction for the collateral process (prearrangement), which follows the machining of FIG. 10, corresponds to the aforesaid Stage 1 and the instruction for the collateral processing (measurement) corresponds to the aforesaid Stage 6.

First, the work instructions are read (Step S1), and whether or not read data is "<" that indicates the beginning of a functional code is determined (Step S2). If the data is not "<", the read data is displayed, as it is, on the display screen of the CRT/MDI unit 70 (Step S15). Thereafter, the processes of Steps S1, S2 and S15 are repeated as long as regular statements are read with "<" not read. Then, the statements described in the work instructions are displayed directly on the display screen. In the case of the work instruction of the aforesaid process 1, the regular statement portion up to "Stage 1 . . . depress display button" is displayed as it is.

If "<" is read, the next functional code is read (Step S3), and whether or not the code is decodable is determined (Step S4). If the code cannot be decoded, that is, if an unregistered functional code or the like is described, the processing advances to Step S16, whereupon an inquiry process is carried out. This inquiry process will be discussed later. If the code is decodable, whether the functional code is "<END>" that indicates the end of the work instruction or whether it is "e" that indicates the end of the section is determined (Steps S5 and S6). If the functional code is neither "<END>" nor "e", an argument described subsequent to this functional code is read until ">" is read (Steps S7 and S8). Then, whether the functional code is of the interactive type (code b) or of the automatic processing type (code m) is determined (Steps S9 and S10).

If the functional code is of the interactive type (code b), this interactive functional code is preprocessed. More specifically, button data assigned by a first argument is read from the host system, and a figure of a button is displayed on the display screen of the CRT/MDI unit 70. When <b/button 1, draw 1.doc> is read in the aforesaid Stage 1, the plotting data on the button named "button 1" is read from the host system and displayed on the display screen (Step S13), whereupon the processing returns to Step S1.

If the read code is of the automatic processing type (code m) (Step S10), on the other hand, preprocessing for an automatic processing function mentioned later is carried out (Step S11). If it is determined, as the result of the preprocessing, that the automatic processing is not possible and that a flag F2 is set to "0" (if there is no program for the commanded automatic processing, for example) (Step S12), the inquiry process of Step S16 is started. If it is determined that the automatic processing can be effected by the flag F2=1, the processing proceeds to Step S1. If the read code is neither of the interactive type nor of the automatic processing type, it is a program name, so that a program of this program name is read from the host system and loaded into the RAM 13 (Step S14), whereupon the processing returns to Step S1.

When the functional code "e" indicative of the section end is read in Step S6 after the processes of Steps S1 to S16 are repeatedly executed in this manner, the processing proceeds from Step S6 to Step S17, whereupon whether or not this section is an interactive section is determined. In other words, whether or not the commanded functional code for this section is of the interactive type (code b) is determined. If the section is not of the interactive type, whether or not it is a section of the automatic processing type is determined (Step S18). If the section is an interactive section, the interactive section is executed (Step S19). If the section is an automatic processing section, this automatic processing section is executed (Step S20), whereupon the processing proceeds to Step S1. If the section is neither the interactive section nor the automatic processing section, the processing proceeds directly to Step S1.

If the section of the aforesaid Stage 1 is read as a work instruction, for example, the processes of Steps S1 to S16 are repeated. Thereupon, the explanation diagram display button, "button 1", is displayed together with the message, "Stage 1 . . . depress display button". Subsequently, a message "work coordinate system center . . . depress completion button" and the work completion button, "button 2", are displayed together with the messages on the display screen. When the functional code "e" indicative of the section end is read, the processing proceeds from Step S6 to Step S17. Since the section is the interactive section, the function of the interactive section is executed (Step S19).

Figure 5:
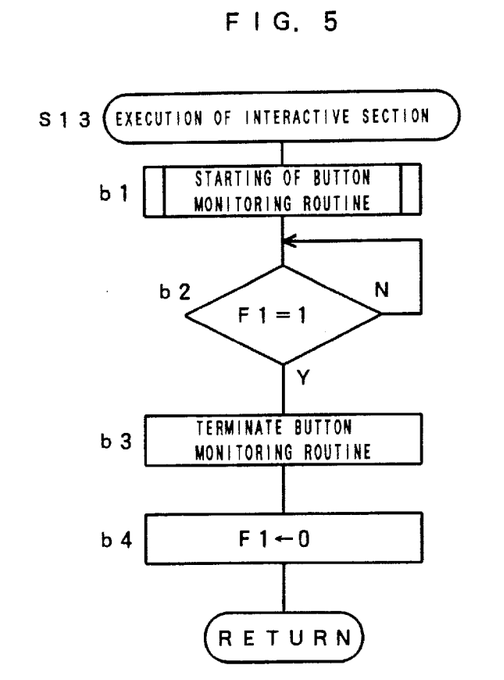
FIG. 5 is a flowchart for the execution of an interactive section according to the same embodiment.
Figure 6:
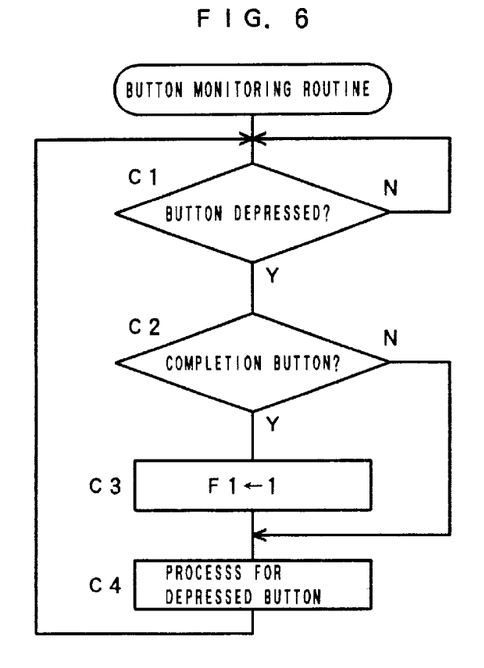
FIG. 6 is a flowchart for a button monitoring routine according to the same embodiment.

FIG. 5 is a flowchart of an execution process for this interactive section. First, a button monitoring routine process shown in FIG. 6 is started (Step b1), and a flag F1, which is indicative of the end of operation for the section, is awaited until the flag F1, to indicate the operation for the section is over, is set to 1 (Step b2).

In the button monitoring routine process (FIG. 6), whether or not the displayed button is depressed (or whether or not the displayed button is clicked) is determined (Step c1). If the button has been depressed, whether or not the depressed button is the work completion button (work completion button, "button 2", in the section of the aforesaid Stage 1) is determined (Step c2). If the depressed button is not the work completion button (or when the explanation diagram request "button 1" is depressed in the case of the section of the aforesaid Stage 1), a process for the depressed button is executed to read an explanation diagram for work from the host system and display it on the display unit (Step c4), whereupon the processing returns to Step c1. On this newly displayed explanation diagram, a button for requesting an explanation, such as a further detailed explanation diagram and message, are displayed. When this button is depressed (Step c1), an additional detailed explanation diagram and a message are displayed, and a button for an additional explanation request is also displayed.

In other words, work explanation diagrams and explanation messages are stratified, ranging from generic ones to more detailed ones. At first, only generic explanation diagrams and messages are displayed. When the buttons for requesting the explanation are depressed in Steps c1 to c4, progressively detailed explanation diagram and a message are displayed with every button depression. In this way, the operator may display necessary messages and explanation diagrams which meets the level of his skill and carry out operation by utilizing the display as a guide, depending on his skill. A return button is displayed the explanation diagram of each stratum, and the first explanation diagram is restored when this button is depressed.

When the work completion button is depressed, the flag F1 that is indicative of the completion of operation is set to "1" (Step c3), whereby the completion of the operation is reported.

While this button monitoring routine process is being executed, the individual messages are synthesized by means of the voice synthesizer 20 and are issued in the form of voices from the voice generating means 80. Alternatively, hardware and software for animation processing may be employed so that the operation can be explained by means of animations.

As described above, the work explanation diagrams and messages are stratified, and the detailed explanation diagram and message are displayed when the corresponding explanation diagram request button is depressed. Thus, the operator may display necessary explanation diagrams according to his skill. If the operator is highly skilled and experienced in the field, he may carry out the operation and depress the work completion button without depressing the explanation diagram request button at all. If the operator is not highly skilled, he may depress the explanation diagram request button until an explanation diagram and message which he can understand is displayed, and then he carries out the operation according to the explanation diagram and the message and depress the work completion button.

When the flag F1 is set to "1" as the work completion button is depressed after the arrangement work is finished in this manner, the processor 11 detects this in Step b2, brings the button monitoring routine to an end (Step b3), and restores the flag F1 to "0" (Step b4), thereby finishing the execution of this interactive section.

Figure 4:
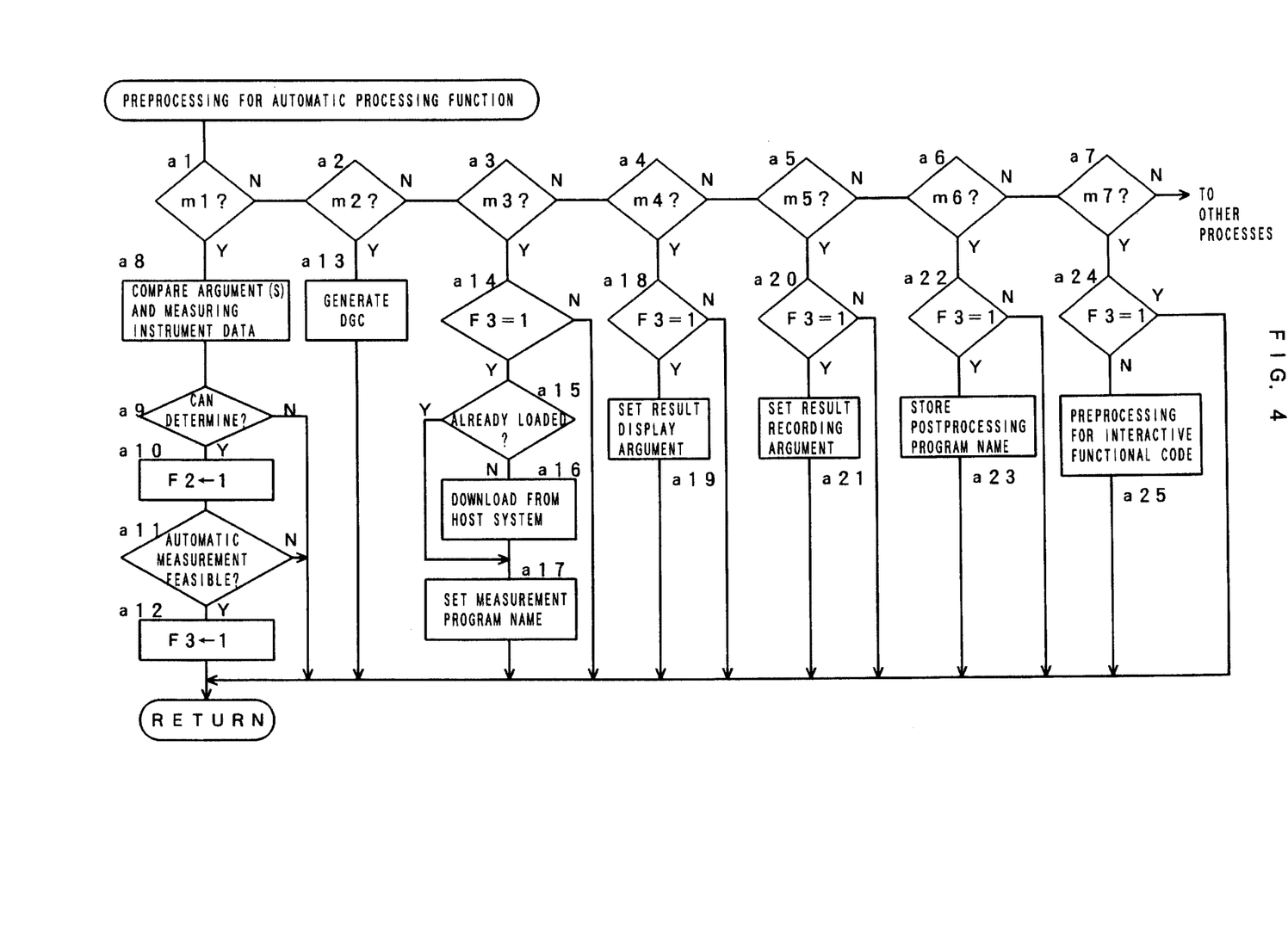
FIG. 4 is a flowchart for preprocessing of an automatic processing functional code according to the same embodiment.

When an automatic processing functional code is read, on the other hand, the preprocessing of Step S11 shown in FIG. 4 is carried out. The following is a description of an example of this preprocessing based on the case of the measurement in the aforesaid Stage 6.

First, the read code m is determined (Steps a1 to a7, . . . ). If the code m is m1, the contents of an argument described together with the code m1 and data of the measuring instrument included in the system data are compared (Step a8) to determine whether a determination on the automatic processing is possible or not (Step a9). If this determination can be made, the flag F2 is set at "1" (Step a10), and whether or not the automatic processing is feasible is then determined (Step a11). If the automatic processing is feasible, a flag F3 is set to "1" (Step a12). If the automatic processing is determined to be unfeasible (Step a9) or if the automatic measurement is determined to be unfeasible (Step a1), the processing returns to the main routine without setting the flags F2 and F3 to "1".

Suppose, for example, that the following data is stored as the system data.

"Measuring instrument: available
Type: type 1 (contact type)
Dimensions: three
Stroke X: 700 mm
Y: 500 mm
Z: 400 mm
Resolution: 0.01 mm
. . ."

If the measurement commanded by the work instruction is designed to measure a pocket hole having a diameter equal to the reference value 150 mm with the allowable error of ±0.01, as in the aforesaid Stage 6, on the other hand, it indicates that the measurement can be made by means of the measuring instrument stored in the system data, that is, the measuring instrument that is attached to the machine. In this case, it is determined that the measurement is feasible, and the flag F3 is set to "1" (Step a12), whereupon the processing returns to the main routine.

In the case where the measurement is not possible, for example, when the allowable error commanded by the work instruction is ±0.005 mm, when a pocket hole diameter is so large that the hole diameter cannot be measured at the stroke stored in the system data, or when the system data include no measuring instrument data (or when the machine is not provided with any measuring instrument), however, the processing returns to the main routine without setting the flag F3 to "1".

When the code m2 is read (Step a2), DGC is generated. More specifically, the host system is previously loaded with a model program corresponding to the code m2, and the program is completed by applying a value described as an argument of m2 to the model. In the case of this code m2, the code means that a measurement is made with every predetermined number of workpieces. That is, measurement is made with every 100 workpieces, and a monitoring routine program for detecting a 100th event and an event processing routine program for measurement after the occurrence of the event are formed (Step a13).

When the code m3 is read (Step a3), moreover, whether the flag F3 is "1", or not, that is, whether the automatic processing is feasible or not is determined (Step a14). If the automatic processing is feasible with the flag F3 at "1", whether or not the RAM 13 of the controller 1 is already loaded with a program (program of measuring instrument) of a program name described as an argument of this code is determined (Step a15). If the RAM 13 is not loaded, the program is downloaded from the host system (Step a16). Then, this program name is set in a register (Step a17), and the processing returns to the main routine. If the flag F3 is not set to "1", the processing returns to the main routine without any execution.

When the code m4 is read (Step a4), a result displaying argument is set (Step a19) if the flag F3 is set to "1" (Step a18). If the flag F3 is not at "1", the processing returns directly to the main routine.

When the code m5 is read (Step a5), nothing is executed unless the flag F3 is at "1". If the flag F3 is at "1" (Step a20), a result recording argument is set (Step a21), whereupon the processing returns to the main routine.

When the code m6 is read (Step a6), nothing is executed unless the flag F3 is at "1". If the flag F3 is at "1" (Step a22), a program name for postprocessing described in the argument is stored (Step a23), whereupon the processing returns to the main routine.

When the code m7 is read (Step a7), since automatic measurement is carried out, nothing is carried out if the flag F3 is at "1". If the flag F3 is not at "1" (Step a24), since the manual measurement is to be carried out, the message described together with the code m7 is displayed, and preprocessing for the interactive functional code indicated by the code b, that is, "button 1", is displayed (Step a25), and the aforesaid interactive processing between the operator and the controller 1 is executed to provide the explanation of the manual measurement to the operator. Then, the processing returns to the main routine. Although only the codes associated with the automatic measurement have been described with reference to FIG. 4, the same processing is also executed in the cases of any other automatic processing codes.

When the code "e", which is indicative of the end of section, is finally read after the individual codes of the Stage 6 are read, the processing advances from Step S6 to Steps S17 and S18, whereupon an automatic type section becomes feasible (Step S20). This automatic type section is executed in the manner shown in FIG. 7. The processing of FIG. 7 is also started as the operation of the machine tool is started.

When "END" is read at the end of the work instruction (Step S5) after returning to processing shown in FIG. 3, the processing for the entry of this work instruction is finished. When a machining command is given to the controller 1, machining is started in accordance with machining programs, sequence programs, etc. loaded in Step S14, and the automatic section processing shown in FIG. 7 is also started.

Figure 7:
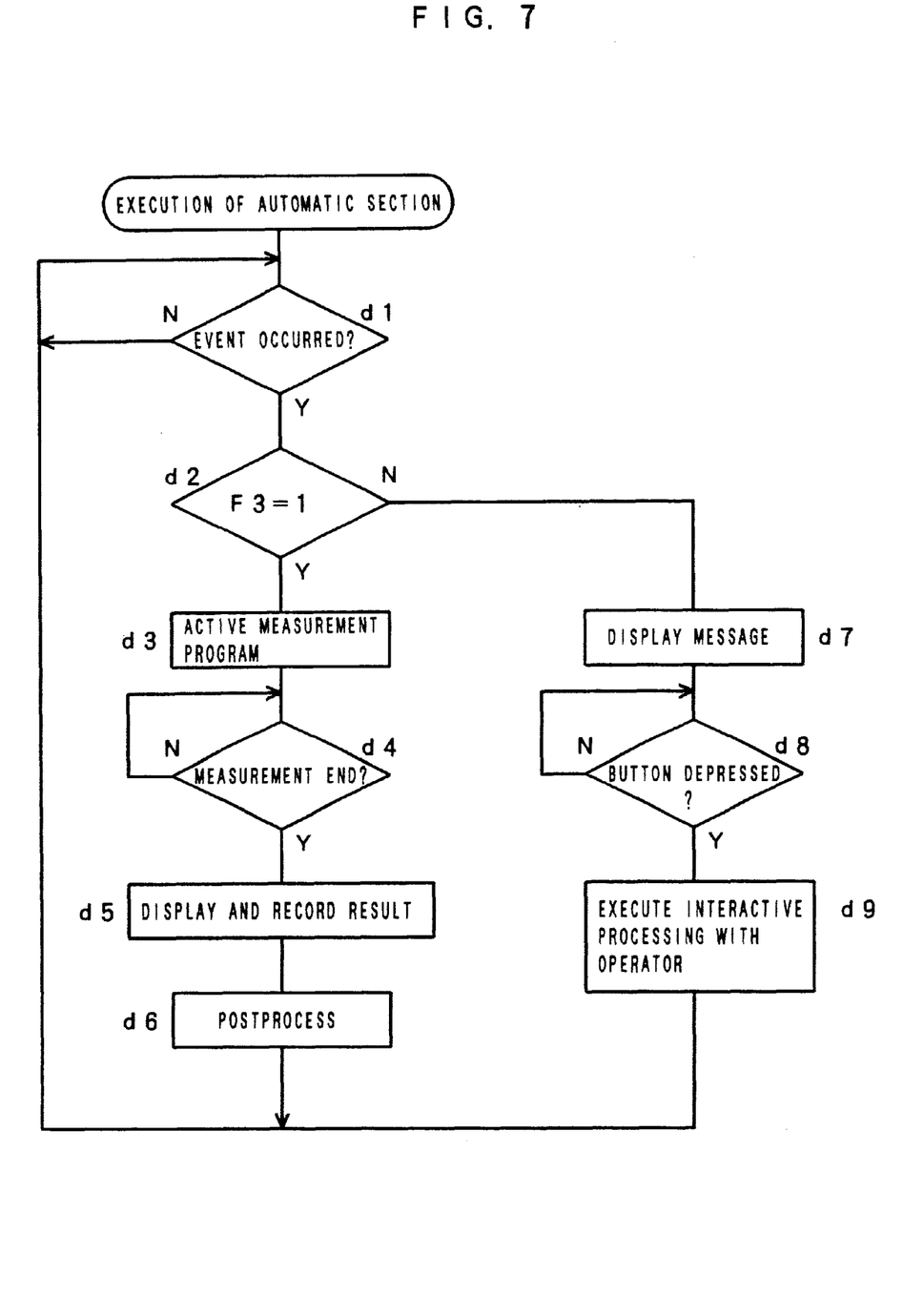
FIG. 7 is a flowchart for the execution of an automatic section according to the same embodiment.

The automatic section processing shown in FIG. 7 is started as the event monitoring routine program and the event processing routine generated by DGC in the aforesaid Step a13 are activated.

First, whether or not an event has occurred, that is, whether or not machining of the 100th workpiece is finished, is determined (Step d1). If the event has occurred, whether or not the flag F3 is at "1" for the automatic measurement is determined (Step d2). In the case of the automatic measurement with F3=1, the measurement program of the program name stored in Step a17 is activated (Step d3), whereupon the automatic measurement is started. When a measurement termination signal is delivered from the measuring instrument (Step d4), the result of this measurement is displayed on the display unit screen of the CRT/MDI unit 70 in accordance with the arguments set in Steps a19 and a21, and is stored in the RAM 13 (Step d5). Then, the postprocessing program of the program name stored in Step a23 is executed (Step d6), and the occurrence of the next event is awaited.

On the other hand, in the case of the manual measurement with the flag F3 not at "1", a message for the manual measurement and a button are displayed (Step d7). When the button is depressed (Step d8), the same processing for interaction between the controller 1 and the operator as that for the aforesaid interactive section is carried out (Step d9). When the operator measures the workpiece and depresses a measurement completion button, the processing returns to Step d1, whereupon the occurrence of the next event is awaited.

Figure 8:
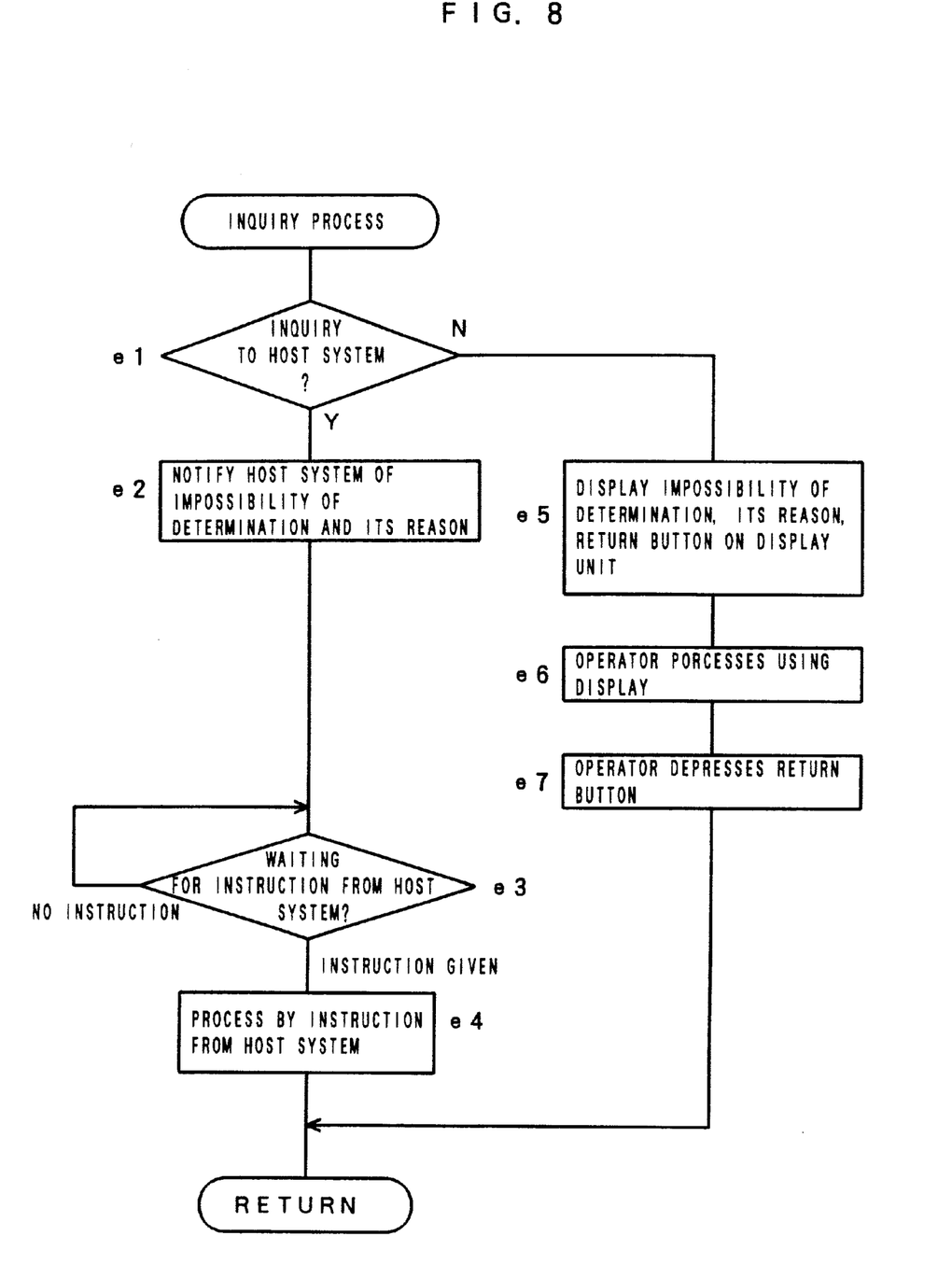
FIG. 8 is a flowchart for an inquiry process according to the same embodiment.

The following is a description of the inquiry process of Step S16. For the inquiry process, two methods can be selected such that the host system is asked for obscure particulars or that the particulars are displayed on the display unit to be processed by the operator. The inquiry method to be used is described in advance in the header portion of the work instruction. Instead of being described in the header portion, the inquiry method may be stored as system data.

FIG. 8 is a flowchart of this inquiry process. First, whether the inquiry is directed to the host system or to the operator by being displayed is determined. In the present embodiment, this instruction is described in the header portion of the work instruction, so that the determination is made on the basis of the description in this header portion (Step e1). If it is determined that the inquiry to the host system is set, the host system is informed of impossibility of determination and the reason therefore. For instance, as discussed previously, in the case where no functional code is registered or where, even if a functional code is registered, the system data are not good enough to execute processing for an indicated registered functional code, the host system is notified of it (Step e2). Then, an instruction from the host system is awaited. When the instruction is given, processing is executed in accordance with the instruction (Steps e3 and e4). After this processing is finished, the main routine is restored.

If the inquiry to the operator is set, on the other hand, impossibility of determination, the reason therefore and the return button are displayed on the display unit (Step e5). When the return button is depressed after the operator's processing is finished (Steps e6 and e7), the main routine is restored.

When production facility, such as a machine or production system, to be controlled by means of the controller 1 is changed, or when an automatic processing machine, such as an automatic measuring instrument, is added or removed, for example, the contents of the actual production facility do not agree with the system data stored in the CMOS memory 14. In such a case, the system data are read and displayed on the display unit of the CRT/MDI unit 70, and the system data are modified or updated in conformity with the changed production facility and loaded into the CMOS memory 14. Further, in the case where the system data are managed by means of the host system, when the system data are changed, they are transmitted to the host system through the communication network, and the system data are modified or updated.

What is claimed is:

1. A controller for production facility, comprising:

a control device for controlling a production system, as a control object;

a storage device storing system data on the construction, capacity, and specifications of said production system; and a determining device interpreting, based on compatibility between work instructions and the system data stored in said storage device, whether or not the contents of the work instructions can automatically be processed by said control device.

2. A controller according to claim 1, wherein said work instructions are composed of instructions for machining operation to be carried out by the production system and instructions for collateral operations incident to the machining operation.

3. A controller according to claim 2, wherein said instructions for collateral operations include instructions for a prearrangement as preprocessing for the machining operation and/or instructions for measurement as postprocessing for the machining operation.

4. A controller according to claim 1, further comprising a display device displaying explanations for manual processing on display device when said determining device determined that automatic processing is not possible, so that the control device can guide an operation by the manual processing with said display device and interaction by an operator's entry through an input device.

5. A controller according to claim 4, wherein a plurality of said explanations to be displayed on said display device, are provided, stratified ranging from generic ones to detailed ones, so that the operator is able to have progressively detailed descriptions displayed each time a request for further explanation is inputted through the input device.

6. A controller according to claim 1, wherein said work instructions are inputted to the controller in the form of a language comprising a regular statement and a functional code having a special meaning, the functional code constituting a work instruction program, and the regular statement being displayed, as the comment of the program, on a display unit of the controller.

7. A controller according to claim 1, wherein said control section comprises a CNC section including an NC program processing unit for decoding and executing NC machining programs, a servo amplifier for driving the machine, a programmable controller for processing digital signals and analog signals transferred between the machine and a peripheral apparatus, and an I/O port through which actual signals are inputted and outputted, and an additional section for automatically processing those parts which cannot be processed by the CNC portion.

8. A controller according to claim 7, further comprising a converter device converting those work instructions which can be processed by said CNC section, among the work instructions which were determined to be able to be automatically processed by said determining device, into commands for the CNC section, so that the converter device, said determining device and a receiving device receiving the work instructions are formed collectively as one functional block of control software.

9. A controller according to claim 1, wherein said controller is connected to a host system by a communication network, the host system being designed to be able to manage the system data stored in said storage means and give the work instructions to the controller.

10. An apparatus comprising:

a storage device storing specifications of a production facility;

a control device controlling a plurality of machines in the production facility; and a determining device determining if machine programming intended for a machine of the plurality of machines can be processed automatically on the machine based on compatibility between the machine programming and the stored specifications.

11. An apparatus as recited in claim 10, further comprising a display device displaying explanations for manual processing on display device when said determining device determined that automatic processing is not possible, so that the control device can guide an operation by the manual processing with said display device and interaction by an operator's entry through an input device.

12. A method comprising:

storing specifications of a production facility;

controlling a plurality of machines in the production facility; and determining if machine programming intended for a machine of the plurality of machines can be processed automatically on the machine based on compatibility between the machine programming and the stored specifications.

13. A method as recited in claim 12, further comprising displaying explanations for manual processing when said determining determined that automatic processing is not possible, so that operation by manual processing can be performed.

* * * * *

UNITED STATES PATENT AND TRADEMARK OFFICE
CERTIFICATE OF CORRECTION

PATENT NO. : 6,246,920 B1
DATED : June 12, 2001
INVENTOR(S) : Tohru Mizuno et al.

Page 1 of 1

It is certified that error appears in the above-identified patent and that said Letters Patent is hereby corrected as shown below:

Title page,
Item [75], change "Tama" to -- Tokyo --; change "Oshino-mura" to -- Minamitsuru --.

Column 3,
Line 10, change "servo motors" to -- servomotors --.

Signed and Sealed this

Twenty-ninth Day of January, 2002

Attest:

Attesting Officer

JAMES E. ROGAN
*Director of the United States Patent and Trademark Office*